July 21, 1931.    J. H. KLIPSTEIN    1,815,850
GRIDDLE CAKE TURNER
Filed May 31, 1930

J. H. Klipstein
INVENTOR

BY Victor J. Evans
ATTORNEY

Patented July 21, 1931

1,815,850

UNITED STATES PATENT OFFICE

JAMES H. KLIPSTEIN, OF MARSHALL, VIRGINIA

GRIDDLE CAKE TURNER

Application filed May 31, 1930. Serial No. 458,687.

This invention relates to new and useful improvements in griddle cake turners and has for the primary object the provision of a device of the stated character including a turning plate having a handle attached to one corner thereof, whereby a partly cooked cake may be easily and quickly removed from the griddle and replaced thereon in its formed position with the uncooked side against the griddle without the liability of breaking or disarranging the partly cooked cake.

Another object of this invention is the provision of the handle having an operating means, whereby the turning element may be easily turned or reversed with the partly cooked cake thereon without moving the turning element away from engagement with the griddle and which will automatically return the turning element to its original position when manually released.

A still further object of this invention is the provision of a griddle cake turner of the above stated character which will be simple, durable and efficient and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention reference is to be had to the following description and accompanying drawings in which.

Figure 1:
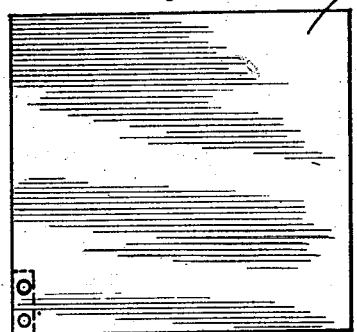
Figure 1 is a plan view illustrating a griddle cake turner constructed in accordance with my invention.

Referring in detail to the drawings, the numeral 1 indicates a substantially rectangular turning plate or element which has riveted or otherwise secured to one corner thereof a rod 2 journaled in a handle 3. The handle 3 is retained on the rod 2 by a collar 4 and an operating member 5. The operating member 5 is secured to the rod 2 adjacent the handle 3 in any desirable manner and preferably by having the member 5 extending through and wedged in an opening formed in the rod. The actuating member 5 extends beyond the handle 3 and is curved to form a finger grip while the other end is adapted to abut a stop 6 secured to one end of the handle for limiting the rotation of the rod 2. A coil spring 7 is mounted on the rod and has one end secured thereto as shown at 8 while the other end is secured to the stop 6 as shown at 9. The spring normally urges one end of the actuating member in engagement with the stop 6.

Figure 2:
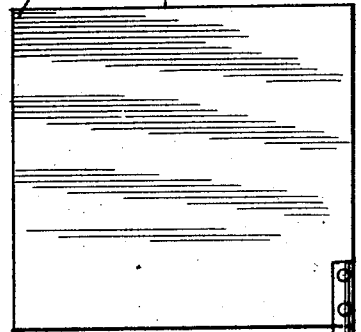
Figure 2 is similar view partly in section illustrating the turning element moved to a reverse position.
Figure 3:
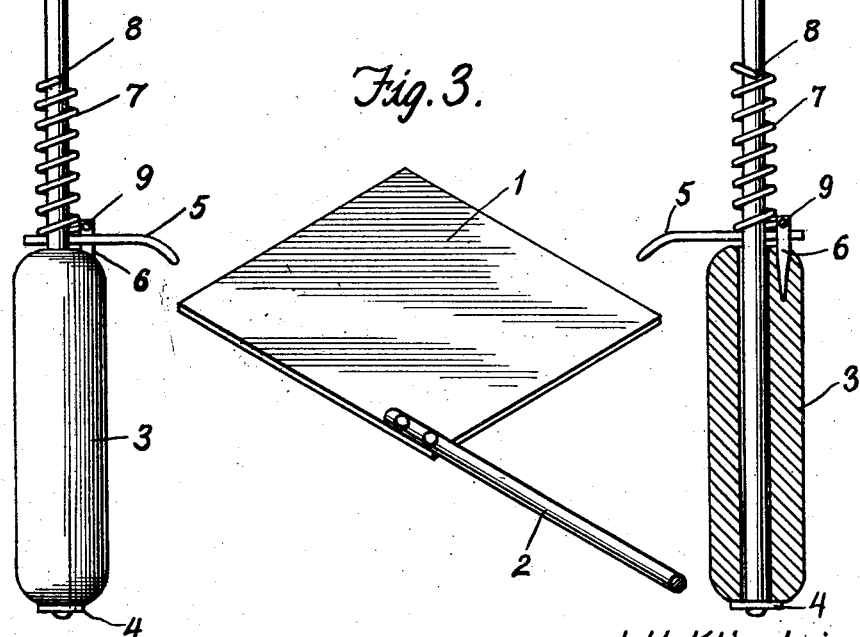
Figure 3 is a fragmentary perspective view illustrating the turning element.

In operation a person grips the device by the handle 3 and places the plate 1 under a partly cooked cake on a griddle as shown in Figure 1 and with the cake so positioned, the operator turns the plate 1 into the position shown in Figure 2 by swinging or pushing upon the actuating member 5 with the thumb or index finger. With the device as shown in Figure 2 the cake is reversed with the uncooked side disposed against the griddle. The operator releases the actuating member 5 and the spring 7 returns the plate 1 into its original position or as shown in Figure 1. From the foregoing description taken in connection with the accompanying drawings, it will be noted that the cake can be turned on the griddle without removing the plate 1 after being placed under the cake from an engagement with the griddle. When the cake, partly cooked has been positioned on the plate 1 as shown in Figure 1, the plate is moved laterally a short distance and by turning the actuating member 5 as before described, the cake will be reversed and positioned with the uncooked side against the griddle.

While I have shown and described the preferred embodiment of my invention, it will be understood that minor changes in construction, combination and arrangement of parts may be made without departing from the spirit and scope of the invention as claimed.

Having thus described my invention, what I claim is:

1. A griddle cake turner comprising a plate, a rod secured to one corner of the plate, a handle journalled on the rod, a stop carried by the end of the handle located the closest to the plate, a coiled spring mounted on the rod with one end secured to the latter and the other end secured to the stop, and an operating member extending through the rod between the spring and said last mentioned end of the handle and having one end thereof in engagement with the stop under the influence of the spring and having the other end curved to provide a finger piece disposed laterally of the handle.

2. A griddle cake turner comprising a plate having a straight edge, and an operating handle secured to the plate in alignment with said edge and in the plane of the plate, whereby the plate may be turned on said straight edge and handle as an axis, while said edge is in the plane of a griddle.

In testimony whereof I affix my signature.

JAMES H. KLIPSTEIN.